United States Patent [19]

Brecht et al.

[11] Patent Number: 4,931,367

[45] Date of Patent: Jun. 5, 1990

[54] LOW FLOAT TECHNOLOGY BATTERY

[75] Inventors: William B. Brecht, Hatfield, Pa.; David O. Feder, Madison, N.J.; Joseph M. McAndrews, Freeport, N.Y.; Allan J. Williamson, King of Prussia, Pa.

[73] Assignee: C & D Charter Power Systems, Inc., Plymouth Meeting, Pa.

[21] Appl. No.: 264,218

[22] Filed: Oct. 28, 1988

[51] Int. Cl.$^5$ ............................................. H01M 10/44
[52] U.S. Cl. ........................................... 429/50; 320/4; 379/324
[58] Field of Search ................... 379/324; 320/4, 9; 429/50

[56] References Cited

U.S. PATENT DOCUMENTS

| 1,846,246 | 2/1932 | Bowditch | 320/4 X |
| 4,401,935 | 8/1983 | Yerkes | 320/9 |

FOREIGN PATENT DOCUMENTS 403508 12/1933 United Kingdom ................ 379/324

OTHER PUBLICATIONS

J. J. Lander, "Further Studies on the Anodic Corrosion of Lead in $H_2SO_4$ Solutions," Ibid., 103, (1956), pp. 1–8.
P. Ruetschi & R. T. Angstadt, "Anodic Oxidation of Lead at Constant Potential," Ibid., 111, (1964), pp. 1323–1330.
P. Ruetschi & B. D. Cahan, "Anodic Corrosion & Hydrogen & Oxygen Overvoltage on Lead & Lead Antimony Alloys," Ibid., 104, (1957), pp. 406–412.
E. Willihnganz, "Accelerated Testing of Stationary Batteries," Electrochem. Technology, 6, (1968), pp. 338–341.
A. G. Cannone, D. O. Feder & R. V. Biagetti, "Positive Grid Design Principles," B.S.T.J., Sep. 1970, pp. 1279–1304.
D. P. Reif & I. Glasa, "A New Concept: Intermittent Charging of Lead Acid Batteries in Telecommunications Systems," Proceedings of INTELEC 1984, pp. 67–72.
J. T. Wadden, D. P. Reid, I. Glasa, "Non-Destructive Testing of Telephone Stationary Batteries," Proceedings of INTELEC 1979, pp. 49–52.
W. B. Brecht, "Structural Considerations in Lead Acid Stationary Cell Design Proceedings of INTELEC", 1986, pp. 31–34.
C & D Power-Battery Spec.-1984.
"Lead Acid Batteries", pp. 3–6.
Float Voltage-Pacific Bell, May 17, 1988.
Young and Lunsford, *Automatic Power Plants for Telephone Offices,* Bell Telephone System Technical Publications, May 1931.

*Primary Examiner*—Stephen J. Kalafut
*Attorney, Agent, or Firm*—Charles N. Quinn

[57] ABSTRACT

In a device for providing stand-by power to an electrical apparatus, such as a telephone switching system, the battery contained therein is maintained at a positive plate polarization of about 20 to 40 millivolts per cell.

45 Claims, 2 Drawing Sheets

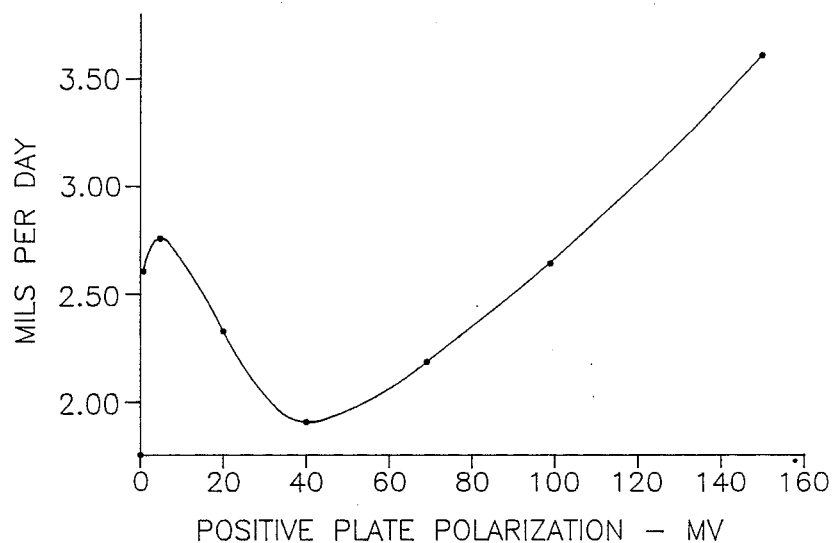

LOW FLOAT TECHNOLOGY BATTERY

FIELD OF THE INVENTION

This invention relates to batteries and systems using batteries for stand-by or emergency power.

BACKGROUND OF THE INVENTION

Lead-acid batteries serve as back-up power supplies for electrical equipment in industrial and commercial systems requiring uninterrupted operation. Telephone switching systems and computer back up systems are examples of systems that use lead acid batteries to provide stand-by power in case of interruption of public utility service.

As used herein, the following terms to have the following meanings:

"Cell": An assembly of a positive plate and a negative plate, spaced apart from each other, which produces an electrochemical reaction, manifesting itself as a voltage potential between the two plates, when an electrolyte containing sulfuric acid is introduced into the cell. The cell may contain a separator located between the positive and negative plates.

"Positive plate": A metal plate, within a cell, containing an active material that is electrochemically reduced during cell discharge.

"Negative plate": A metal plate, within a cell, containing an active material that is electrochemically oxidized during cell discharge.

"Electrolyte": A solution which transports electrons and which, in some cases, participates in reactions at the positive and negative plates.

"Battery": A device containing a cell, or a group of cells connected in series, and having positive and negative terminals.

"Half-cell reaction": An electrochemical reaction occurring at either the positive or negative plate in the presence of electrolyte.

"Thermodynamic equilibrium": The state wherein flow of current through a cell or half-cell is infinitesimally small and the electrochemically active species are at unit activity.

"Potential": The electromotive force, measured as volts associated with an electrochemical reaction or combination of reactions.

"Standard potential": The thermodynamic equilibrium potential of a half-cell reduction reaction as measured by the standard hydrogen electrode.

"Polarizations": The deviation in potential, from the standard potential, of a half-cell reaction caused by flow of current through the half-cell. Polarization typically changes as current through the half cell changes.

"Recombinant cell": A cell in which, during charging or recharging, oxygen produced at the positive plate by hydrolysis of water reacts with lead at the negative plate to produce lead oxide which in turn is reduced to metallic lead, liberating oxygen which in turn forms water.

In lead-acid batteries, the positive plate is made by filling the spaces of metallic lead or lead alloy grid with lead sulfate paste. The lead sulfate paste converts electrochemically to $PbO_2$ during battery "forming" or initial charging. During this process, the surface of the lead or lead alloy grid reacts with electrolyte, creating a film of $PbO_2$ on the grid. Thus the positive plate has an interior grid of metallic lead or lead alloy, with $PbO_2$ in the spaces of the grid.

The negative plate is made by filling the spaces of a lead or lead alloy grid with lead sulfate paste. During battery forming or initial charging, the lead sulfate paste converts electrochemically to metallic lead. Thus the negative plate contains a grid of lead or lead alloy with spongy lead in the grid spaces.

The lead sulfate paste for both the positive and negative plates may also contain various organic additives, to improve the properties of the paste or the resultant lead or $PbO_2$.

The electrolyte for a lead acid battery contains sulfuric acid.

A typical battery cell contains an alternatives series of positive and negative plates with separators between facing positive and negative plates. Separator materials include rubber, silica-filled polyethylene, matsw made of glass, polyester and the like, and a variety of other materials.

Lead-acid batteries always have at least one cell and typically have a group of cells connected in series.

The cells are either wet cells or recombinant cells. Wet cells have excess electrolyte over and above the amount of electrolyte which is absorbed and adsorbed by the plates and separators in the cell. Recombinant cells typically have less electrolyte with the electrolyte typically being absorbed into the plates or the separator material or being gelled such as by addtion of formed silica to the electrolyte.

Potential across a cell is the sum of (i) the standard potential for the half-cell reactions at the positive and the negative plates, (ii) the positive plate polarization, (iii) the negative plate polarization and (iv) the voltage drop corresponding to the electrical resistance of the electrolyte. In many cells, voltage drop caused by resistance of the electrolyte is negligible.

Positive plate polarization is the polarization occurring at the positive plate, which is the $PbO_2$ plate in a lead-acid battery cell. Negative plate polarization is the polarization at the negative plate, which is the lead plate in a lead-acid battery cell. Presence or absence of various elements at or in plate influences the degree of polarization for a given electrical current. Antimony or platinum in the negative plate depolarize the negative plate (i.e. presence of antimony or platinum causes potential of the negative plate to remain at the standard potential up to a higher current level than would be achieved if the antimony or platinum were not present. In recombinant cells, $O_2$ depolarizes the negative plate.

In general, degree of polarization is proportional to the logarithm of the current flowing through the half-cell; this is known as the Tafel equation.

The degree of positive plate polarization depends on the overall potential imposed across the cell and on the amount of negative plate polarization present at the current flowing out of the battery, which resulting from the overall cell potential or voltage. It is desirable to accurately control positive plate polarization, for battery cells because positive plate polarization during float or stand-by condition, i.e. where the batter is not preparing its intended function of supply energy, in order to increase battery life.

For batteries in stand-by service, it is desirable to maintain the battery in a maximum state of readiness. Cells in batteries in an open-circuit condition i.e. having nothing connected to them, gradually self-discharge and lose their ability to perform when needed. To counteract this charging voltage (a voltage greater than the standard potential of the cell) is maintained across the cell; this counteracts the cell's tendency to self-discharge. Maintaining a cell with a charging voltage being applied in an amount just above the cell standard potential is called "floating" the cell.

At potentials above the standard potential for the reversible $PbO_2/PbSO_4$ reaction by which lead-acid batteries operate, lead in the positive plate grid corrodes to $PbO_2$. Since $PbO_2$ takes up more volume than metallic lead, the positive plate grid expands with such conversion of lead to $PbO_2$ occurring during float. If the grid expands too much, the grid loses electrical contact with the $PbO_2$ in the grid spaces. Hence, while "floating" the cell loses its ability to perform if the positive plate grids grow excessively. Since $PbO_2$ is the electrochemically active part of the positive plate during battery discharge, loss of electrical contact between the grid and the $PbO_2$ results in loss of capacity for the cell or the battery containing the cell.

Lander, Ruetschi and others [J. J. Lander, "Anodic Corrosion of Lead in $H_2SO_4$ Solution," J. Electrochem. Soc., 98 (1951) pp. 213–219; "Further Studies on the Anodic Corrosion of Lead in $H_2SO_4$ Solutions," J. Electrochem. Soc., 103 (1956) pp. 1–8; P. Ruetschi & R. T. Angstadt, "Anodic Oxidation of Lead at Constant Potential," J. Electrochem. Soc., 111 (1964) pp. 1323–1330; P. Ruetschi & B. D. Cahan, "Anodic Corrosion & Hydrogen & Oxygen Overvoltage on Lead & Lead Antimony Alloys," J. Electrochem. Soc., 104 (1957) pp. 406–412] recognized the phenomenon of lead corrosion in positive plate grids of lead-acid batteries over thirty years ago. From their studies of lead corrosion rates, they concluded that corrosion rate was minimized under float conditions where positive plate polarization was fifty (50) to two hundred (200) millivolts. Willihnganz [E. Willihnganz, "Accelerated Testing of Stationary Batteries," Electrochem. Technology, 6 (1968) pp. 338–341] supported this conclusion with elevated temperature accelerated testing of batteries. Willihnganz concluded that maintaining positive plate polarization at fifty (50) to one hundred (100) millivolts maximized plate life.

A more recent study by Reid et al (D. P. Reid & I. Glassa, "A New Concept: Intermittent Charging of Lead Acid Batteries in Telecommunications Systems," Proceedings of INTELLEC 1984, pp. 067–072) indicates that for certain starved electrolyte lead-acid batteries, ("starved electrolyte batteries" are batteries containing less electrolyte than the battery capacity for electrolyte. In the context of "starved electrolyte batteries", the battery capacity for electrolyte is the amount of electrolyte which can be absorbed by the battery plates and separators.) intermittent or cyclical charging, rather than constant float charging, extends battery life. Reid et al apparently did not look for optimum float or charging voltages or the effect of positive plate polarization on grid growth.

Industry practice has been to float battery systems at positive plate polarizations of fifty (50) to one hundred (100) millivolts to provide optimal battery life.

The ability to control positive plate polarization depends on the ability to control polarization at the negative plate. At the time of the early studies on lead corrosion as a function of positive plate polarization, when batteries contained lead-antimony alloys in the negative plate grid, the antimony depolarized the negative plate. Thus, during float positive plate polarization could be fixed by setting overall cell voltage since negative plate polarization was predictably zero (0) or was very small. When lead-antimony grids were used, practice was to float cells at an overall voltage of 2.15 volts per cell.

Problems with lead-antimony systems, such as antimony migration, led to adoption of lead-calcium alloys for battery grids. Since calcium, unlike antimony, does not depolarize the negative plate, polarization of the negative plate when lead-calcium alloys were used was unpredictable with respect to the overall cell voltage or cell current during float. Behavior of the negative plate in early lead-calcium alloy containing cells varied greatly from plate to plate, depending on factors such as method of fabrication and types of organic additives in the plate.

Uncertainty about the polarization behavior of the negative plate led to use of higher overall cell potentials to ensure adequate positive plate polarization to allow for some unknown negative plate polarization). For batteries in telephone switching systems, the industry increased the overall float potential to 2.17 volts per cell.

Present batteries having lead-calcium alloy grids do not have the problem of unpredictable negative plate polarization. These batteries are depolarized at the negative plate; this is achieved by including an appropriate amount of platinum in the negative plate. For float conditions of interest for lead-acid batteries, negative plate polarization now is zero (0) or acceptably small due to platinum's depolarizing effect on the negative plate.

Telephone industry practice is to float an overall cell potential of 2.17 volts. Thus, the cells are maintained at positive plate polarization of about seventy (70) to eighty (80) millivolts or more depending on the amount of platinum at the negative plate. This positive plate polarization is in accordance with the accepted belief heretofore, as set forth by Willihnganz, et al. noted above.

The standard potential of a lead-acid cell is 2.059 volts. The difference between 2.170 and 2.059, namely 0.111, is the total polarization present in the cell. When the positive plate is at 0.080 volts (80 millivolts) polarization, the remaining polarization, namely 0.030 volts, is at the negative plate. The amount of platinum present is controlled during manufacture, by design, to permit this amount of negative plate polarization.

Telephone switching systems operate in a narrow range of voltage from about forty-five (45) to about 53.5 volts. Batteries supplying stand-by power for telephone switching systems must provide power in this voltage range for the switching systems.

Voltage supplied by a battery is the sum of the voltage for each cell, for the cells in series in the battery. Thus, the voltage range of the telephone switching system can be used to calculate a voltage range per cell in the battery.

While a telephone switching system may impose limitations on acceptable voltage output range per battery cell, the cells may be able to deliver current over a wider voltage range. For example, if a battery contains twenty-four (24) cells in series and the low voltage limit for the telephone switching system is 45.12 volts, the low voltage limit for the telephone switching system is 1.88 volts per cell, whereas the cell may be capable of providing adequate power at much lower cell voltages.

Lead-acid wet cells often have a design end discharge voltage of about 1.75 volts per cell. The "design end discharge voltage" is the lowest cell voltage at which the cell can continue to supply a preselected constant discharge current. The difference between the lowest voltage acceptable by the telephone switching system and the design end discharge voltage for the cell represents available but unused battery cell capacity. For example, a battery providing 110 amp-hours over a three hour discharge period and having an end discharge voltage of 1.85 volts per cell at the end of three hour discharge period may be able to provide a 120 amp-hour over the same three hour discharge period if an end voltage of 1.80 volts per cell is acceptable. Thus, it is desirable to reduce the end discharge voltage per cell corresponding to the lowest voltage the telephone switching system can tolerate, in order to use more of the battery's designed capacity.

The upper voltage limit of the telephone switching system limits maximum charging voltage for the battery. As with the lower voltage limit, this maximum voltage limit for the telephone switching system can be translated to a maximum voltage limit per battery cell. If the maximum voltage tolerable by the telephone switching system is 52.08 volts, then a battery with twenty-four (24) cells in series has a maximum voltage per cell of 2.17 volts.

BRIEF DESCRIPTION OF THE DRAWINGS

FIG. 2 is a plot of grid growth rate versus positive plate polarization for a wet cell battery.

SUMMARY OF THE INVENTION

Figure 1:
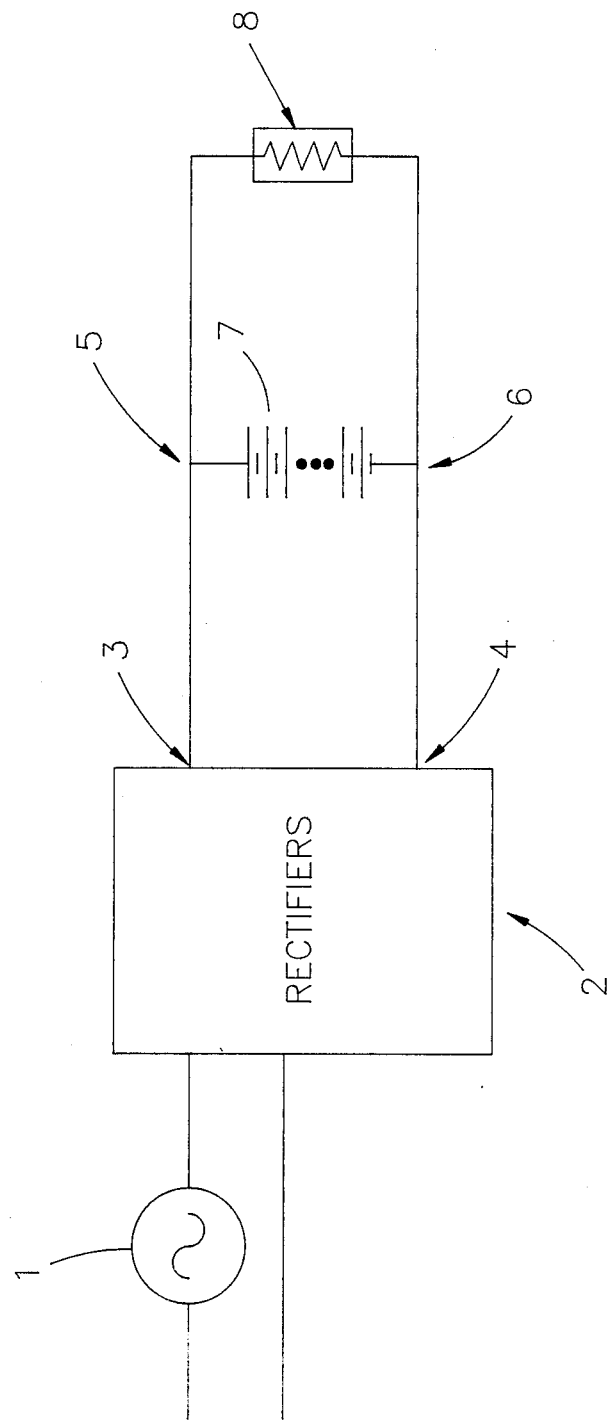
FIG. 1 is a schematic diagram of a system utilizing having batteries for stand-by power.

Contrary to accepted premises regarding lead acid cell positive plate polarization and grid growth, applicants have discovered that the minimum rate of grid growth occurs at positive plate polarization of about forty (40) millivolts. Applicants have also discovered that grid growth at positive polarization in the range of about twenty (20) to about forty (40) millivolts per cell is no worse than at positive plate polarizations of seventy (70) to eighty (80) millivolts per cell, previously thought to be optimum polarization.

An aspect of Applicants' invention is floating lead acid cells at lower overall voltages than heretofore thought possible without increasing the rate of positive plate grid growth. For narrow voltage window systems such as telephone switching systems requiring stand-by power, the lower float voltages of the invention allow an increased number of cells in series for batteries used in such systems. Applicants' invention permits lowered end discharge voltage and consequent use of previously unusable battery capacity.

The invention provides a method of controlling or minimizing positive plate grid growth in lead-acid cells maintaining the positive plate or plates at a polarization of about twenty (20) to about forty (40) millivolts.

The invention further provides a method of prolonging useful life of lead-acid batteries by maintaining the battery cells at a positive plate polarization of about twenty (20) to about forty (40) millivolts per cell, thereby controlling positive plate grid growth in the battery cells.

The invention also provides an improvement in a method for supplying stand-by power to electrical apparatus. This method comprises continuously rectifying a conventional sixty (60) Hertz A.C. public utility supplied voltage to a D.C. voltage compatible with an electrical system of interest. The resulting D.C. voltage is applied to the electrical system. A lead-acid battery having lead-acid electrochemical cells connected in series, is provided in parallel across the output terminals of the rectifying means, so that, on interruption of output from the rectifying means, the battery provides voltage to the electrical system with current moving in the same as direction as that previously provided by said rectifying means. The battery contains a sufficient number of cells in series so that the cells are maintained at a positive plate polarization of about twenty (20) to about forty (40) millivolts per cell using the output D.C. voltage from the rectifying means.

The invention provides an improvement in electrical systems comprising rectification means, electrical load apparatus such as a telephone switching system, and a battery comprising a string of lead-acid cells connected in series for supplying stand-by power. The rectification means receives conventional sixty (60) Hertz A.C. voltage from a public utility and converts the voltage to a D.C. current at a voltage suitable for use by the electrical apparatus. The battery and the electrical apparatus are in parallel across the output terminals of the rectification means, so that on interruption of D.C. voltage from the rectification means, the battery provides D.C. voltage to the electrical apparatus in the same direction of current flow as previously provided. The battery contains sufficient cells in series so that the cells are maintained at about twenty (20) to about forty (40) millivolts positive plate polarization by D.C. voltage from the rectification means.

The lead-acid cells of the invention are preferably antimony-free, that is grids of the positive and negative plates substantially do not contain antimony. The grids may be alloys of lead with calcium. The cells may be wet cells or recombinant cells. The negative plates may be depolarized with platinum. When the invention is used with recombinant cells, the inherent depolarizing effect of the oxygen reaction at the negative plate may be utilized to provide the requisite depolarization of the negative plate. The cells may have separators between positive and negative plates. The preferred separator material for wet cells is silica-filled polyethylene available from Evans Corporation as Evanite or from W. R. Grace as Daramic.

One way to lower battery end discharge voltage to a level closer to design end discharge voltage (and hence to utilize more of the battery's actual capacity) is to increase the number of cells in series in the battery. For example, a battery with twenty-five (25) cells in series can operate down to an end discharge voltage of 1.80 volts per cell for a lower equipment voltage limit of forty-five (45) volts.

Prior to the invention, increasing the number of cells in series from twenty-four (24) to twenty-five (25) was throught to be impractical or impossible because a twenty-five (25) cell battery floated at too low a voltage given the upper voltage limit of the system. Namely, the battery floated at a voltage which, prior to the applicant's invention, was thought to be a voltage at which rapid positive plate grid growth occurred significantly diminishing the practical life of the battery.

In the improvement to telephone switching systems, preferred positive plate polarization is about twenty-five (25) millivolts per cell. At this polarization level, lead-acid wet cells float at 2.085 volts per cell in a battery containing twenty-five (25) cells in series, rather than the conventional twenty-four (24) cells in series.

The increased number of cells, while staying within the voltage window of the switching equipment, allows an end discharge voltage of about 1.80 volts per cell compared to 1.88 volts per cell conventional end discharge voltage.

The lower acceptable end discharge voltage allows greater consumption of the cells' total stored electrochemical energy since cells provide more amp-hours as the accepted end discharge voltage is lowered. The use of previously unusable capacity results in a substantial cost savings for batteries used to provide stand-by power. These savings may be realized not only in telephone switching systems, but also in other systems employing lead-acid batteries for stand-by electrical power.

Thus, the invention makes possible cost savings due to prolonged battery life and cost savings due to more efficient battery usage.

DESCRIPTION OF PREFERRED EMBODIMENTS

The following experiment illustrates an aspect of applicants' invention relating to control of grid growth as a function of positive plate polarization. While the experiment used wet cells, the results apply to recombinant lead-acid cells as well.

EXPERIMENT

The experiment used conventional 840 AH PbCa telecommunication cells (wet cells) whose fabrication was carefully controlled. To eliminate effects of grid alloy, grid design and grain size, all positive grids were from the same casting lot, single positive and negative paste lots were utilized and all positive plates were carefully measured prior to assembly. Cells were processed as a single lot through formation and characterization. The cells were cycled to repeatable initial capacity values and tafel characteristics were carefully determined.

In-situ grid size measurements were performed using ultrasonic reflection procedures. (These procedures are known, accepted grid size measurement procedures—see J. T. Wadden, D. P. Reid, I. Glassa, "Non-Destructive Testing of Telephone Stationary Batteries," Proceedings of INTELLEC 1979, pp. 49–52.) The measurements were prepared with sufficient repetitions to ensure valid results for the top, middle and bottom of each of the five positive plates in each cell. The cells were then placed in hot rooms at 160° F., and were maintained at positive polarizations of 0, 5, 20, 40, 70, 100, and 150 mv above the reversible $PbO_2/PbSO_4$ potential. Five cells were tested at 70 mv while two cells were tested at each of the other polarization values. At intervals generally 30 days, growth, capacity and tafel measurements were repeated.

The ultrasonic technique was similar to that described by Walden et al. except that the cell containers were not physically restrained to prevent bulging. Also six half-inch calibration blocks were provided within the cell, adjacent to the container wall.

Lack of restraint on and resultant bulge of the container walls due to pressure of the liquid electrolyte within the container was compensated for by measuring the container wall at each of the three plate locations for every positive plate, with a set of digital calipers accurate to 0.001". From that measurement the cumulative thickness of the container wall and the values of the reflections from the ultrasonic measurement were subtracted to obtain positive plate width.

Using the six half inch calibration blocks, the reflectoscope was calibrated at each plate location to offset effects of stratification and any other variable which might affect speed of ultrasonic beam transmission through the electrolyte.

In order to ensure precise and accurate reflectoscope measurements, each measurement was read three times to within a tolerance of 5 mils (0.005"). This procedure was repeated, as necessary, if data analysis showed any readings to be in error. The confidence level in the measured data was high as a result of comparing the data obtained ultrasonically to that gathered by direct mechanical measurement. Table I shows the average time, ±1 standard deviation, in days for grid growth to reach 0.500" (approximately 4.17 percent growth) for each of the polarization values tested. FIG. 2 and Table I show growth rate in mils (thousands of an inch)/day versus polarization.

TABLE I

| GRID GROWTH VS POSITIVE POLARIZATION | | | |
|---|---|---|---|
| POSITIVE POLARIZATION MV | DAYS TO 500 MILS GROWTH | | |
| | AVG. | STD. DEV. | MILS/DAY |
| 0 | 193 | ±1 DAY | 2.59 |
| 5 | 182 | ±2 DAYS | 2.74 |
| 20 | 215 | ±1 DAY | 2.32 |
| 40 | 261 | ±1 DAY | 1.91 |
| 70 | 229 | ±2 DAYS | 2.18 |
| 100 | 189 | ±1 DAY | 2.64 |
| 150 | 139 | ±1 DAY | 3.59 |

The data demonstrates that:
1. Minimum growth occurs at a polarization of forty (40) mv, in contrast to the fifty (50) to one hundred (100) mv values previously reported for both grid growth and grid alloy corrosion.
2. Surprisingly, at twenty (20) mv, growth is only slightly faster than at seventy (70) mv and is virtually identical to growth at eighty (80) mv. Hence the data suggests no catastrophic differences in growth due to floating anywhere between twenty (20) to eighty (80) mv positive polarization, although the forty (40) mv minimum rate is at least twenty-five (25) percent lower than the twenty (20)–eighty (80) mv extremes.

A preferred embodiment of the invention relates to telephone switching systems using batteries having lead-acid wet cells to supply stand-by power.

Referring to FIG. 1, the switching system comprises rectification means 2 for converting A.C. public utility-supplied voltage to a D.C. voltage level suitable for use by the load, typically telephone switching apparatus. As shown in FIG. 1, battery and switching apparatus are in parallel across output terminals 3, 4 of rectification means 2. Upon interruption of output from rectification means 2, battery 7 maintains a D.C. voltage across terminals 5 and 6 suitable for use by the telephone switching apparatus 8 in the same direction of current flow as previously provided from rectification means 2.

Telephone switching apparatus 8 operates in a narrow voltage window of about forty-five (45) to about 53.5 volts. Since battery 7 and the switching apparatus 8 are in parallel with respect to rectification means 2, the voltage across battery 7 and switching apparatus 8 is the same.

In conventional systems employing lead-acid wet cell batteries, the battery contains twenty-four (24) cells connected in series. These cells float at 2.17 volts per cell which is an overall battery voltage of 52.08 volts. The battery end discharge voltage is about 45.12 volts, corresponding (approximately) to the lower operating voltage limit of the switching apparatus. The lower limit on battery voltage corresponds to an end discharge voltage of about 1.88 volts per cell.

In one aspect of the invention, the battery contains twenty-five (25) lead-acid wet cells in series rather than twenty-four (24) as in a conventional battery. The increased number of cells in series is made possible by the lower float voltage per cell according to the invention. The lower float voltage per cell is in turn made possible by the discovery that the minimum rate of positive grid growth occurs at about forty (40) millivolts positive plate polarization per cell and that positive plate polarizations of about twenty (20) to about forty (40) millivolts per cell result in a rate of grid growth less than or equal to the rate at polarization of seventy (70) to eighty (80) millivolts per cell.

In the preferred twenty-five (25) cell embodiment, cells float at about twenty-five (25) millivolts per cell positive plate polarization corresponding to a cell voltage of about 2.085 volts.

The end discharge voltage in the preferred embodiment is about 1.80 volts per cell. Since the end discharge voltage in the preferred embodiment is lower than conventional end discharge voltages for telephone switching systems using lead-acid wet cells, the preferred embodiment uses previously availabale unused call capacity.

The amp-hour capacity of a cell increases with decreasing end discharge voltage, for a given discharge time. At lower end discharge voltages, cell capacity increases significantly. Since the same sized cells are used for greater capacity, cost savings are realized by use of smaller cell sizes or fewer batteries and by less frequent battery replacement. The savings for conventional telephone switching systems are estimated to be as much as twenty-five (25) percent of the battery installed cost.

In the preferred embodiment, the lead-acid wet cells use silica-filled polyethylene separators. These separators help maintaince of stable cell conditions at low positive plate polarization (about twenty-five (25) millivolts per cell). At less than forty (40) millivolts positive plate polarization results using rubber separators.

While telephone switching systems using lead-acid wet cells are a principal focus of the invention, the invention is not limited to telephone switching upstair. The invention has across-the-board applicability to stand-by power systems utilizing lead-acid batteries.

We claim:

1. A method of controlling positive plate grid growth in a floated lead-acid electrochemical cell comprising maintaining the cell at a positive plate polarization of about twenty (20) to about forty (40) millivolts.

2. The method of claim 1 wherein the cell is antimony-free.

3. The method of claim 2 wherein the cell comprises at least one plate whose grid comprises an alloy of lead and calcium.

4. The method of claim 1 wherein the cell is a wet cell.

5. The method of claim 1 wherein the cell is a recombinant cell.

6. The method of claim 3 wherein the cell contains at least one negative plate that is depolarized with platinum.

7. The method of claim 1 wherein the cell comprises at least one separator between at least one positive plate and at least one negative plate.

8. The method of claim 7 wherein the separator comprises silica-filled polyethylene.

9. The method of claim 1 wherein the cell is maintained at a positive plate polarization of about forty (40) millivolts.

10. The method of claim 1 wherein the cell is maintained at a positive plate polarization of about twenty-five (25) millivolts.

11. A method of prolonging the useful life of a lead acid battery in float comprising at least one electrochemical cell comprising at least one positive plate, at least one negative plate and an electrolyte, the method comprising maintaining the at least one cell at a positive plate polarization of about twenty (20) to about forty (40) millivolts.

12. The method of claim 11 wherein the cell is antimony-free.

13. The method of claim 12 wherein the cell comprises at least one plate whose grid comprises an alloy of lead and calcium.

14. The method of claim 11 wherein the cell is a wet cell.

15. The method of claim 11 wherein the cell is a recombinant cell.

16. The method of claim 13 wherein the cell contains at least one negative plate that is depolarized with platinum.

17. The method of claim 1 wherein the cell comprises at least one separator between at least one positive plate and at least one negative plate.

18. The method of claim 17 wherein the separator comprises a silica-filled polyethylene.

19. The method of claim 11 wherein the cell is maintained at a positive plate polarization of about forty (40) millivolts.

20. The method of claim 11 wherein the cell is maintained at a positive plate polarization of about twenty-five (25) millivolts.

21. In a system comprising electrical apparatus and a battery for providing stand-by D.C. voltage for said apparatus in the event of interruption of conventional sixty (60) hertz A.C. public utility service electrical current said system including:
   A. rectification means, receiving a conventional (public utility) sixty (60) hertz A.C. voltage for converting said A.C. to D.C. voltage suitable for use by the electrical apparatus;
   B. an electrical apparatus, receiving said D.C. voltage and using said D.C. voltage for functioning of said apparatus;
   C. a battery containing lead-acid electrochemical cells connected in series;
   D. connection of said battery and said apparatus in parallel across output terminals of the rectification means;
   E. connection of said battery and said apparatus such that on interruption of D.C. voltage from the rectification means, the string would provide D.C. voltage to the apparatus in the same direction of current flow as previously provided by said rectification means;

the improvement comprising said battery containing a sufficient number of cells in series so that the cells are maintained at about twenty (20) to about forty (40) millivolts positive plate polarization per cell by the D.C. voltage from said rectification means.

22. The system of claim 21 wherein the cells are antimony-free.

23. The system of claim 22 wherein the cells comprise at least one plate whose grid comprises an alloy of lead and calcium.

24. The system of claim 21 wherein the cells are wet cells.

25. The system of claim 21 wherein the cells are recombinant cells.

26. The system of claim 23 wherein the cells contain at least one negative plate that is depolarized with platinum.

27. The system of claim 21 wherein the cells comprise at least one separator between at least one positive plate and at least one negative plate.

28. The system of claim 27 wherein the separator comprises silica-filled polyethylene.

29. The system of claim 21 wherein the cells are maintained at a positive plate polarization of about forty (40) millivolts per cell.

30. The system of claim 21 wherein the cells are maintained at a positive plate polarization of about twenty-five (25) millivolts per cell.

31. The system of claim 21 wherein the string comprises twenty-five (25) cells in series.

32. The system of claim 21 wherein the electrical apparatus operates in a voltage range of about forty-five (45) to about 53.5 volts.

33. In a telephone switching system, including a battery for providing stand-by D.C. voltage for telephone switching apparatus connected to a telephone communications network in the event of interruption of conventional sixty (60) hertz A.C. public utility service electrical current apparatus, said switching system including:
A. rectification means, receiving a conventional public utility sixty (60) hertz A.C. electrical voltage for converting said A.C. voltage to D.C. voltage of about forty-five (45) to about 53.5 volts;
B. a telephone switching apparatus, receiving said D.C. voltage and using said D.C. voltage for providing telephone switching to and as required by a telephone communication network;
C. a battery containing lead-acid electrochemical cells connected in series;
D. connection of said battery and said apparatus in parallel across output terminals of the rectification means;
E. connection of said battery and said apparatus such that, on interruption of D.C. voltage from the rectification means, the current would provide D.C. voltage to the switching apparatus in the same direction of current flow as previously provided by said rectification means;

the improvement comprising said battery containing a sufficient number of cells is series so that the cells are maintained at about twenty (20) to about forty (40) millivolts positive plate polarization per cell by the D.C. voltage from the rectification means.

34. The system of claim 33 wherein the cells are antimony-free.

35. The system of claim 34 wherein the cells comprise at least one positive plate whose grid comprises an allow of lead and calcium.

36. The system of claim 33 wherein the cells are wet cells.

37. The system of claim 33 wherein the cells are recombinant cells.

38. The system of claim 35 wherein the cells contain at least one negative plate that is depolarized with platinum.

39. The system of claim 33 wherein the cells comprise at least one separator between at least one positive plate and at least one negative plate.

40. The system of claim 39 wherein the separator comprises silica-filled polyethylene.

41. The system of claim 33 wherein the cells are maintained at a positive plate polarization of about twenty-five (25) millivolts.

42. The system of claim 33 wherein the battery comprises twenty-five (25) cells in series.

43. A method of controlling positive plate grid growth in a lead-acid battery comprising electrochemical cells connected in series, comprising maintaining the cells at a positive plate polarization of about twenty (20) to about forty (40) millivolts per cell.

44. In a method of providing stand-by power for use by an electrical apparatus in the event of interruption in conventional sixty (60) hertz A.C. public utility electrical current service, including:
A. continuously rectifying by a rectifying means said A.C. voltage to D.C. voltage suitable for use by the electrical apparatus.
B. providing said D.C. voltage resulting from continuous rectification to said electrical apparatus;
C. positioning a battery containing lead-acid electrochemical cells, connected in series and said electrical apparatus in parallel across output terminals of the rectifying means;
D. positioning said battery and said apparatus such that, on interruption of output from said rectifying means, the battery will provide voltage suitable for use by the electrical apparatus in the same electrical current direction as previously provided by said rectifying means;

the improvement comprising
E. maintaining said cells at a positive plate polarization of about twenty (20) to about forty (40) millivolts per cell while public utility electrical current is being supplied.

45. The method of claim 44 wherein the electrical apparatus is a telephone switching apparatus.

* * * * *